Figure 1:
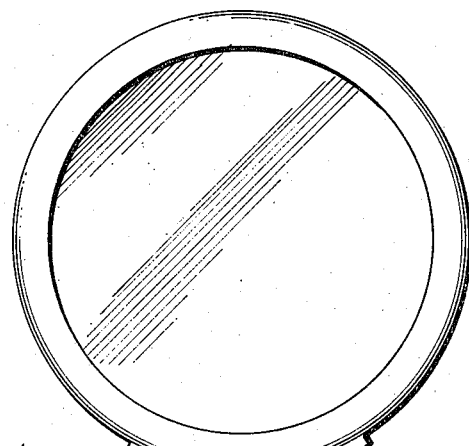
Figure 2:
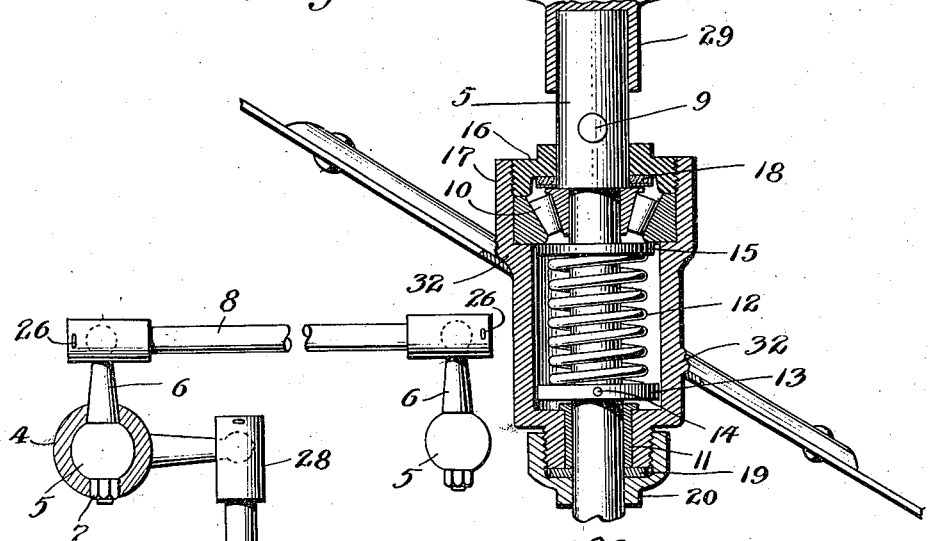
Figure 3:
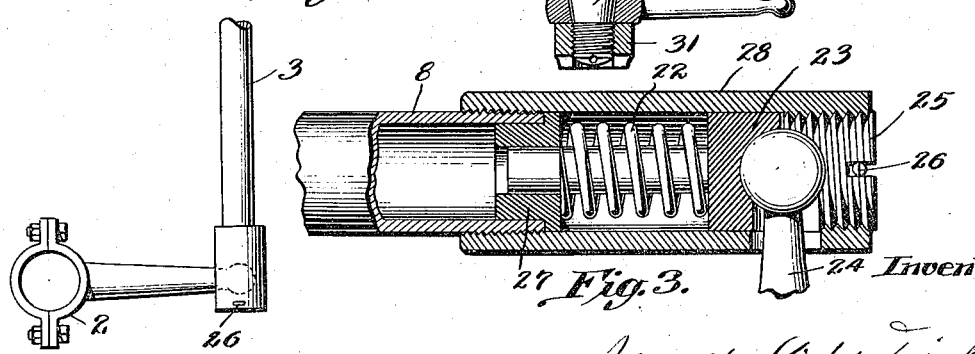

Dec. 14, 1926.

J. KIRKPATRICK

AUTOMOBILE HEADLIGHT

Filed August 24, 1925

1,611,045

Inventor.

James Kirkpatrick

Patented Dec. 14, 1926.

1,611,045

UNITED STATES PATENT OFFICE.

JAMES KIRKPATRICK, OF ALTURAS, CALIFORNIA.

AUTOMOBILE HEADLIGHT.

Application filed August 24, 1925. Serial No. 52,159.

This invention relates to improvements in automobile head lights. The object of the invention being to produce lights that will turn with the steering wheel, so that the car would always follow the path of light; and also to produce lights that will not vibrate, jar loose or rattle. A further object of the invention is to produce a simple and inexpensive device and yet one which will be exceedingly effective for the purpose for which it is designed.

These objects I accomplish by means of such structure and relative arrangement of the parts as will fully appear by a perusal of the following specifications and drawings.

In the drawing:—

Figure I is a vertical section through the mounting of one of the headlight posts, Figure II is a plan view showing the connection between the post and steering apparatus, and Figure III is an enlarged detail section showing the resilient coupling between members 6 and 8.

On the drawings, similar characters of reference indicate corresponding parts in the several views.

Figure I.

6, steering arm, which is fastened into lamp post #5 with tapering end #30 held with jam nut #31, and which turns the lights in either direction following the path of the front wheels.

5, lamp post going through housing #17 which has Timken bearing #10 and bronze bearing #11 which holds lamp post in a firm position.

12, a coil spring pushing down on retainer washer #13 (which is held in place by tapering pin #14) and upward on retainer washer #15, all of which are held in position by outside race of Timken bearing #10.

10, Timken bearing which is held in position with retainer nut #16.

18 and #19, felt washers between Timken bearing #10 and retainer nut #16 to hold grease in lamp post housing, a flange #32 on each side holding housing in firm position on fender #21.

20, packing nut which holds grease retaining felt washer in place.

29, cap which fastens head light to lamp post.

Figure II.

1 and #2, making a clamp fastened to drag link rod or steering rod.

3, connecting rod between clamp and lamp post #5.

4, steering arm which has ball and socket joint on each end as shown in Figure III.

5, lamp post.

6, steering arm which is fastened through lamp post #5 with tapering pin as shown in Figure II, going through #9 in Figure I and fastened on with nut #7.

7, nut.

8, connecting rod with socket joint in each end which connects lamp posts together.

Figure III.

3 and #8, connecting rod tubing which has a bearing #27.

23, bearing which has a tension spring #22 which holds bearing in a firm position against ball #24.

25, jam nut which holds ball in position on outer end. Jam nut is held in position with cotter key #26.

28, housing which is threaded on each end.

From the foregoing description it will readily be seen that I have produced such a device as substantially fulfills the object of the invention as set forth herein.

While this specification sets forth in detail the present and preferred construction of the device, still in practice, such deviations from such detail may be resorted to as do not form a departure from the spirit of the invention, as defined by the appended claims.

Having thus defined my invention, what I claim as new and useful and desire to secure by Letters Patent is—

1. In a dirigible headlight mounting, a casing, a bearing in the top of the casing, a bearing in the bottom of the casing, a post journaled through the bearings, a washer fixed to the shaft interiorly of the casing above the bottom bearing, a second washer disposed about the shaft within the casing immediately below the top bearing, and a coil spring disposed about the shaft within the casing and impinging against the washers.

2. In a dirigible headlight mounting, a casing, a bearing in the top of the casing, a bearing in the bottom of the casing, a post journaled through the bearings, a washer fixed to the shaft interiorly of the casing above the bottom bearing, a second washer disposed about the shaft within the casing immediately below the top bearing, a coil spring disposed about the shaft within the casing and impinging against the washer, said top bearing including an outer race, an inner race, roller bearings between the races, said second washer being held in abutment with the outer race by said spring.

JAMES KIRKPATRICK.